March 19, 1940. E. C. READ 2,193,983
MEANS FOR AND METHOD OF FACILITATING ALIGNMENT OR CENTERING
OF PISTON ROD, PISTON, AND CYLINDER ASSEMBLIES
Filed June 7, 1937
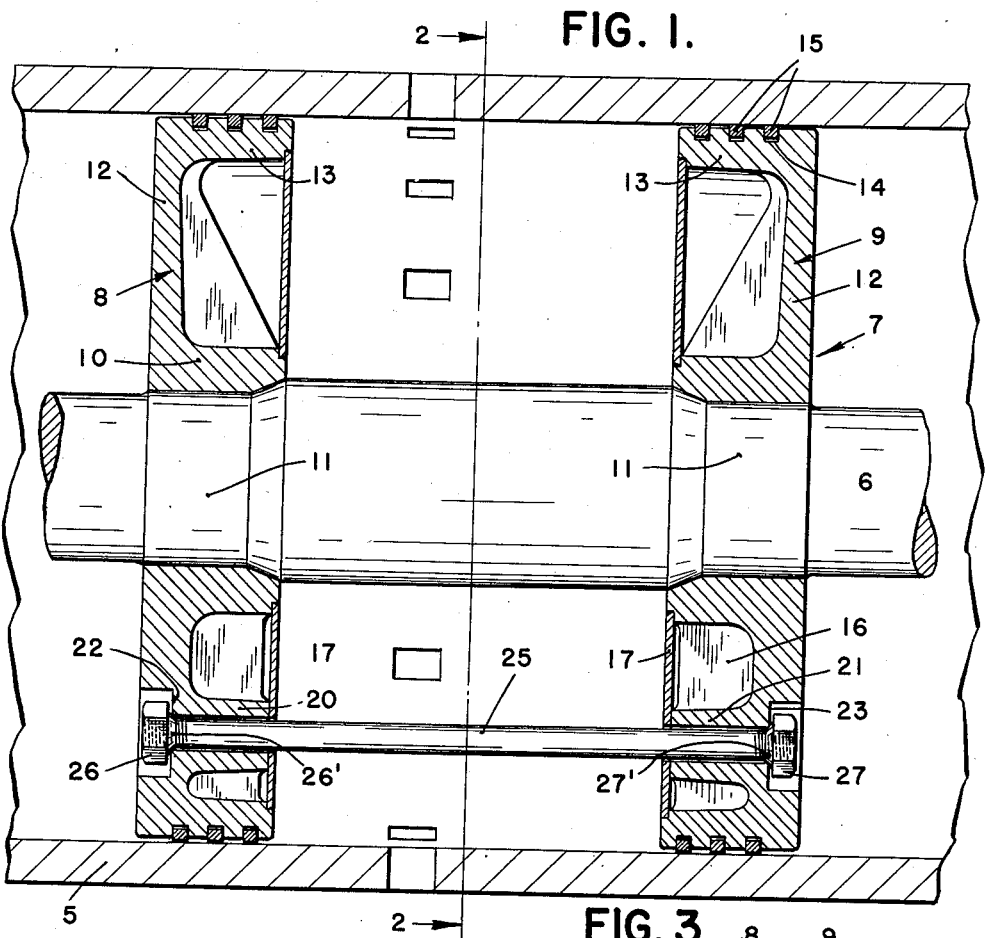
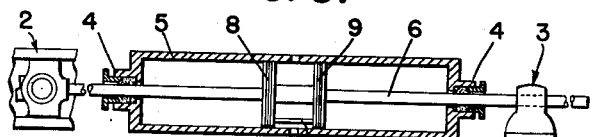
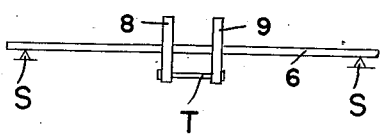
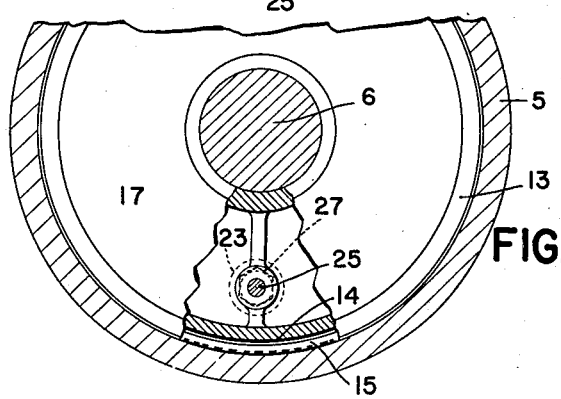
INVENTOR
EVERETT C. READ
BY John W. Michael
ATTORNEY Patented Mar. 19, 1940

2,193,983

UNITED STATES PATENT OFFICE 2,193,983

MEANS FOR AND METHOD OF FACILITATING ALIGNMENT OR CENTERING OF PISTON ROD, PISTON, AND CYLINDER ASSEMBLIES

Everett C. Read, Milwaukee, Wis., assignor to The Filer & Stowell Co., Milwaukee, Wis., a corporation of Wisconsin Application June 7, 1937, Serial No. 146,796

5 Claims. (Cl. 309—4)

This invention relates in general to steam engines and more particularly to a piston and piston rod construction which facilitates and insures alignment of the piston and piston rod with the cylinder with which they are associated.

In certain types of steam engines, uniflow engines for example, the piston rod is floated through the stuffing boxes of the cylinder heads and is firmly supported therebeyond by suitable slides or crossheads, the weight of the piston being hung on the intermediate portion of the piston rod. The weight of the piston being suspended from the piston rod in this manner tends to deflect the rod and cause it to sag in the center. This is undesirable for a number of reasons and to avoid the resulting disadvantages it has been the practice heretofore to heat and hammer or forge the piston rod to bend or camber it to such extent and in such direction that when the piston rod and piston are assembled with the cylinder and their slides or crossheads, the weight of the piston will straighten out the camber in the piston rod and the piston rod and piston will be properly centered in the cylinder.

The expedient of heating and hammering or forging piston rods to produce a camber of this character is expensive and time consuming and moreover is a more or less "hit and miss" proposition or "trial and error" method.

In general the object of the invention is to provide for the convenient though precision alignment of the piston and piston rod with the cylinder while obviating the necessity of heating and hammering or forging the piston rod, thereby improving the structure, facilitating production and minimizing expense.

In carrying out the present invention the piston rod is left straight and true and the piston is assembled therewith. After the piston has been assembled with the rod and before the two are assembled with the cylinder and the piston rod slides or crossheads, the amount of camber or sag which the weight of the piston will produce in the piston rod is determined by supporting the piston rod upon spaced points of support corresponding in their spacing to that of the slides or crossheads upon which the piston rod is supported in the assembled engine. When so assembled upon spaced supports the weight of the piston will produce the sag or camber in the piston rod. Thereupon the sag or camber is corrected or eliminated by tying together the spaced heads of the piston at an appropriate angular point and with just the right amount of tension to overcome the weight of the piston and bring the piston rod back to its straight or true condition. Obviously a variety of particular structures may be resorted to to tie the spaced heads of the pistons together or tension them in the manner described to correct the sag in the piston rod. One way in which this may be advantageously accomplished is to provide aligned bolt holes in the spaced piston heads at an appropriate point angularly thereof and form shoulders on the piston heads adjacent each of these bolt holes. A tension bolt is then extended through the bolt holes and nuts threaded on the ends of the bolt are brought into engagement with the shoulders adjacent the bolt holes to set up the proper tension. Of course, in lieu of having nuts at both ends of the tension bolts, one end thereof may be headed and the other end equipped with a nut.

Other objects and advantages reside in certain novel features of the construction, arrangement and combination of parts which will be hereinafter more fully described and particularly pointed out in the appended claims, reference being had to the accompanying drawing forming a part of this specification, and in which:

Figure 1 is a fragmentary view in central longitudinal cross section showing a piston rod, piston, and cylinder assembly embodying the present invention, parts being shown in elevation for the sake of example and illustration;

Figure 2 is a view in transverse cross section taken on line 2—2 of Figure 1;

Figure 3 is a diagrammatic view showing the step employed to determine the sag or camber which the weight of the piston will set up in the piston rod;

Figure 4 is a similar view showing the step employed to correct or eliminate this sag or camber; and Figure 5 is a diagrammatic view showing the type of engine in which the invention may be embodied.

Referring to the drawing and more particularly to Figures 1 and 2 the numeral 5 designates a cylinder of a steam engine, a uniflow type of steam engine for example. A piston rod 6 is reciprocal in the cylinder, the piston rod extending out through both ends of the cylinder and being floated or guided in the usual manner.

A piston designated generally at 7 is floated in the cylinder 5 and for this purpose is fixed to the piston rod 6 and reciprocates therewith. This piston 7 preferably includes spaced heads designated at 8 and 9. The heads 8 and 9 are of identical construction though oppositely arranged and are accurately and rigidly fixed in position on the piston rod. Each piston head includes a hub portion 10 which is a press fit on a shouldered seat 11 provided on the piston rod 6 so that each piston head is not only constrained to reciprocate with its piston rod but is supported thereon. Integral with the hub 10 of each piston head is the body portion 12 which is of disk-like form and is provided around its periphery with a skirt 13 formed with the grooves 14 in which the piston rings 15 are accommodated. The peripheral surfaces of the skirts 13 are spaced slightly from the inner wall of the cylinder but the piston rings 15 have steam tight engagement therewith. The open spaces 16 of each piston head are inclosed by a cover plate 17 which may have its edges welded to its piston head.

With a piston rod and piston construction of the character described and with the piston rod true and straight, the first step in the present method of correcting or compensating for the camber is to support the piston rod upon spaced supports S in the manner illustrated in Figure 3. The spacing of the supports S corresponds to the spacings of the slides or crossheads in which the piston rod is slidably supported in the assembled engine. When the piston rod and piston are supported on the supports S the rod will sag as illustrated by the full and dotted lines shown in Figure 3.

With the piston rod and piston still on the supports S provision is made to eliminate or correct this sag by applying tension at appropriate angular points thereabout. In Figure 4 this tensioning means is designated generally at T.

One particular construction for applying tension to the spaced heads of the piston in the manner described is illustrated in Figures 1 and 2. As there shown the piston heads 8 and 9 are provided with suitably flanged and longitudinally aligned bolt holes designated at 20 and 21. The face of each piston is recessed around its bolt hole so as to form shoulders or abutments 22 and 23 adjacent the bolt holes 20 and 21 respectively. These bolt holes are appropriately located angularly with respect to the piston and piston rod. Usually their common axis lies in a vertical plane which intersects the common longitudinal central axis of the cylinder, piston rod and piston. A tension bolt 25 is extended through these bolt holes 20 and 21 and has threaded ends projecting therebeyond. Nuts 26 and 27 are threaded on the ends of this tension bolt and have spherical or rounded inner extensions 26' and 27' which bear on the shoulders 22 and 23 around the margins of the outer ends of the bolt holes 20 and 21. By tightening up these nuts 26 and 27 an appropriate amount of tension may be placed on the bolt 25 to cause the bolt and its nuts to pull the piston heads together in such manner and to such extent as to straighten out the piston rod from the position shown in Figure 3 to the position shown in Figure 4. The piston and piston rod when so corrected are ready for assembly with the cylinder, its stuffing boxes and the usual slides or crossheads provided therefor. In the assembly, the piston and piston rod are correctly aligned with and centered in the cylinder and the piston heads will occupy the relation to the cylinder illustrated in Figure 1.

The present invention greatly facilitates the correcting or elimination of sag or camber, requires but a minimum amount of modification of the piston heads and requires but a very few additional parts, namely, the tension bolt and its nut or nuts. Production is speeded up and precision is insured.

In Figure 5 the type of engine in which the invention is employed is diagrammatically illustrated. As there shown, the piston rod 6 floats through its stuffing boxes 4 provided on the ends of the cylinder. One end of the piston rod 6 is supported on the main crosshead 2, the other end by the so-called tail crosshead 3. By supporting the piston rod on the main and tail crossheads it is floated through its stuffing boxes 4 and the piston heads 8 and 9 are floated in the cylinder 5 in accordance with the usual practice in this type of uniflow engine.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. An engine of the character described comprising a cylinder, a piston rod supported at both ends for reciprocation relative to the cylinder, a piston supported on said rod and having spaced heads fixed thereto and a tension member interconnected with the lower portion of said heads for pulling the lower portions thereof toward each other to maintain the piston rod against sagging under the influence of the weight of the piston.

2. An engine of the character described comprising a cylinder, a piston rod supported at both ends for reciprocation relative to the cylinder, a piston supported on said piston rod within said cylinder and having spaced heads fixed to the rod, a tie member extending between the piston heads and adjustably interconnected therewith to pull portions of said heads toward each other to maintain said rod against sagging under the influence of the weight of the piston and to maintain the peripheral surfaces of the heads in slightly spaced relation to the cylinder wall, and piston rings carried by said piston heads and having substantially steam tight engagement with the wall of said cylinder.

3. An engine of the character described comprising a cylinder, a piston rod supported at both ends for reciprocation relative to the cylinder, a piston supported on said piston rod within said cylinder and having spaced heads fixed to the rod, a tension bolt extending between the lower portion of said piston heads, and connections between the end portions of said bolt and said piston heads, at least one of said connections being adjustable whereby the lower portions of the heads may be pulled toward each other to maintain said rod against sagging under the influence of the weight of the piston.

4. An engine of the character described comprising a cylinder, a piston rod, slides for both ends of the rod, a piston supported on said rod within said cylinder and having spaced heads fixed to the rods, and means for pulling the lower portions of the heads together to maintain the piston rod against sagging under the influence of the weight of the piston.

5. An engine of the character described comprising a piston rod having end portions adapted to be supported for reciprocating movement, a piston supported on an intermediate portion of the rod and including spaced heads fixed to the rod, said heads having aligned bolt holes in their central lower portions, a tension bolt extending through said bolt holes and connected at its ends with said heads, there being a nut threaded on at least one end of the rod and bearing against the adjacent piston head whereby the nut may be adjusted to cause the rod to apply such tension to the heads as to maintain the rod against sagging under the influence of the weight of the piston.

EVERETT C. READ.